United States Patent
Smith et al.

(10) Patent No.: US 12,469,059 B2
(45) Date of Patent: Nov. 11, 2025

(54) ELECTRONIC MARKETPLACE CURVE SALES TRANSACTION SYSTEM

(71) Applicant: Mercari, Inc., Palo Alto, CA (US)

(72) Inventors: Colin Smith, Palo Alto, CA (US); John Lagerling, Los Altos Hills, CA (US); Carlo Besozzi, Palo Alto, CA (US)

(73) Assignee: MERCARI, INC., Palo Alto, CA (US)

( * ) Notice: Subject to any disclaimer, the term of this patent is extended or adjusted under 35 U.S.C. 154(b) by 539 days.

(21) Appl. No.: 17/891,520

(22) Filed: Aug. 19, 2022

(65) Prior Publication Data

US 2024/0062261 A1    Feb. 22, 2024

(51) Int. Cl.
*G06Q 30/00* (2023.01)
*G06Q 30/0601* (2023.01)

(52) U.S. Cl.
CPC ............... *G06Q 30/0609* (2013.01)

(58) Field of Classification Search
CPC .................................... G06Q 30/0609
See application file for complete search history.

(56) References Cited

U.S. PATENT DOCUMENTS

| | | | |
|---|---|---|---|
| 11,676,169 | B1 | 6/2023 | Bhow et al. |
| 2009/0307145 | A1 | 12/2009 | Mesaros |
| 2011/0320301 | A1* | 12/2011 | Van Horn ............. G06Q 30/06 705/26.2 |
| 2012/0166268 | A1 | 6/2012 | Griffiths |
| 2013/0006797 | A1 | 1/2013 | Kennedy et al. |
| 2017/0039634 | A1 | 2/2017 | Yenisetty et al. |
| 2017/0061528 | A1 | 3/2017 | Arora et al. |
| 2019/0012687 | A1 | 1/2019 | Endoh et al. |
| 2021/0081979 | A1 | 3/2021 | Taira et al. |
| 2022/0188915 | A1 | 6/2022 | Nariani |
| 2024/0062274 | A1 | 2/2024 | Smith et al. |

OTHER PUBLICATIONS

Kleinberg, Robert, and Tom Leighton. "The value of knowing a demand curve: Bounds on regret for online posted-price auctions." 44th Annual IEEE Symposium on Foundations of Computer Science, 2003. Proceedings . . . IEEE, 2003.*

Ziel, F., et al., "Electricity Price Forecasting using Sale and Purchase Curves: The X-Model," Energy Economics 59:435-454, Elsevier (Sep. 2016).

* cited by examiner

*Primary Examiner* — Kathleen Palavecino
(74) *Attorney, Agent, or Firm* — Sterne, Kessler, Goldstein & Fox P.L.L.C.

(57) ABSTRACT

Various embodiments for a transport dispatch system for marketplace curve sales transaction system are described herein. An embodiment operates by receiving, from a seller, an indication to sell a for sale item through an electronic marketplace. An item curve for the for sale item and a seller curve for the seller are generated. A sales curve is generated for the for sale item based on modifying the seller curve for the for sale item based on the item curve. A display of the sales curve is provided for the for sale item and an approval is received via a user interface. The electronic marketplace is monitored based on the approved sales curve, and the for sale item is sold for the seller based on a correspondence between the list price of the for sale item and a bid price.

20 Claims, 7 Drawing Sheets

ELECTRONIC MARKETPLACE CURVE SALES TRANSACTION SYSTEM

CROSS-REFERENCE TO RELATED APPLICATIONS

This application is related to U.S. patent application Ser. No. 17/891,510, titled "Electronic Marketplace Curve Purchase Transaction System", to Smith et. al., filed herewith, which is herein incorporated by reference in its entirety.

BACKGROUND

Many people use electronic marketplaces to buy and sell goods. However, these people often have to manually monitor the marketplaces to try and get the best price in which to complete their buy or sell transactions. Manually monitoring a marketplace is extremely time consuming and in some cases actually impossible because of the volume of buyers and sellers that may be on the marketplace at any given time. Requiring a user to manually monitor an item to be purchased or sold often results in fewer transactions, increased computing bandwidth being consumed, and more frustrated users.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Many people use electronic marketplaces to buy and sell goods. However, these people often have to manually monitor the marketplaces to try and get the best price in which to complete their buy or sell transactions. Manually monitoring a marketplace is extremely time consuming and in some cases actually impossible because of the volume of buyers and sellers that may be on the marketplace at any given time. Requiring a user to manually monitor an item to be purchased or sold often results in fewer transactions, increased computing bandwidth being consumed, and more frustrated users.

Figure 1:
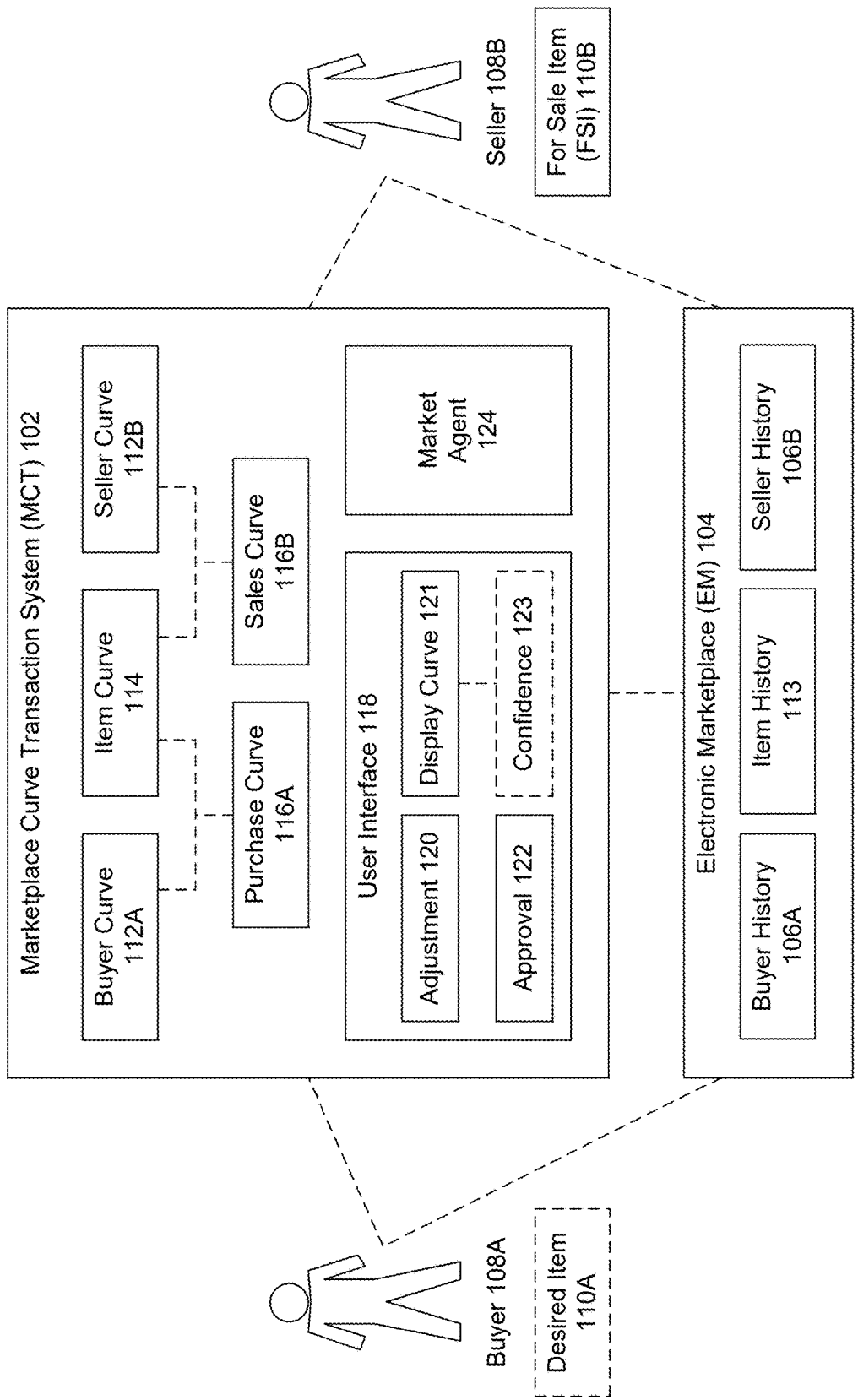
FIG. 1 illustrates a block diagram of a marketplace curve transaction system (MCT), according to some example embodiments.

FIG. 1 illustrates a block diagram 100 of a marketplace curve transaction system (MCT) 102, according to some example embodiments. In some embodiments, MCT 102 automatically completes both sale and purchase transactions on behalf of different users of an electronic marketplace (EM) 104. Through MCT 102, users (both buyers and sellers) are relieved of the burden of trying to continually monitor EM 104 in trying to find a price on an item (to be purchased or sold) that is acceptable to them.

In some embodiments, MCT 102 may automatically create models or curves of supply and demand for a particular item, and the buy and sell tendencies of particular users, to identify a projected or ideal price and/or timeline in which to complete a sale or purchase transaction of an item for a user. In some embodiments, MCT 102 may automatically adjust bid price on behalf of buyers 108A and list prices on behalf of sellers 108B, using their individual price curves and item curves as models for the price adjustments.

EM 104 may include any electronic marketplace, or system of computers providing or configured to provide an electronic platform where users can buy and sell goods and services. Some example EMs 104 include, but are not limited to: MERCARI, EBAY, and AMAZON. In some embodiments, different users of the EM 104 may have their own unique usernames or logins, which EM 104 may use to track their history 106 with regard to their searches and purchase and sales transactions (including attempted transactions, such as listings that did not sell, or bids that were not accepted) for various goods across the EM 104 platform.

For example, EM 104 may track a buyer history 106A for a buyer 108A, and a seller history 106B for a seller 108B. Buyer 108A and seller 108B may be referred to herein generally user 108, and buyer history 106A and seller history 106B may be referred to herein generally as history 106 or user history 106.

This history 106 may include bids by buyers 108A on various items, and list prices by sellers 108B on various items, and any adjustments (manually made by the users 108 and/or automatically made by MCT 102 on behalf of users 108) during the life of the transaction (e.g., until a sale was complete or the listing was removed/the buyer 108A stopped searching for/bidding on the item). History 106 may also include how other users have rated the users 108 based on previous buy/sell interactions on EM 104. In some embodiments, EM 104 may allow for direct or fixed price buy/sell transactions without or in lieu of a prior auction, and/or auction-style buy/sell transactions in which buyers 108A may bid various prices for an item while an auction for the item is still live and/or sellers 108B may adjust list prices during an auction period.

In some embodiments, buyer history 106A may include a history of purchases and bids on products made by buyer 108A on marketplace. Buyer history 106A may include various data about the bids and purchases, such as a variance between a market price or suggested retail price of the item and the ultimate auction sales price and the bid price(s) submitted by buyer 108A. Buyer history 106A may also include a condition of the products being purchased or bid on. Buyer history 106A may also track the sellers 108B on the other ends of the transactions with the buyer 108A, the types of items or categories on which buyer 108A bid, dates of bids/purchases, ratings of buyer 108A as submitted by the sellers, and any other information that may be available through EM 104. The buyer history 106A may include a tracking of an initial offer price on an item and any price adjustments (increases and decreases) made to the initial offer price before the item was sold or the listing was cancelled. In some embodiments, the buyer history 106A may differentiate between manual or buyer 108A initiated price or bid adjustments and those price or bid adjustments made on behalf of buyer 108A by MCT 102.

Similar to buyer history 106A for buyer 108A, seller history 106B may include a history of sales transactions, including items that may have been offered for sale (regardless of whether or not the offering resulted in an actual fixed-price or auction-style sale) for a seller 108B and changes (increases/decreases) in the list prices by seller 108B or MCT 102 on behalf of seller 108B. The seller history 106B may include a variance between a market price, suggested retail price of the item, and/or ultimate auction sales price and the initial price requested by seller 108B.

In some embodiments, the seller history 106B may include the condition of the products that have been offered for sale and any reviews of the seller 108B as submitted by buyers. The seller history 106B may track the buyers with whom seller 108B transacted, the types of items or categories of items offered for sale, dates of sales or listing cancellations and price adjustments, and any other information that may be available through EM 104.

In some embodiments, a user 108 may function as both a buyer 108A and a seller 108B on EM 104 across different transactions, both purchasing and selling products through EM 104. In these cases, a user history 106 may include both a buyer history 106A portion and a seller history 106B portion for the same user 108.

In some embodiments, a buyer 108A may seek to purchase a desired item 110A via EM 104. The buyer 108A may have a particular price the buyer 108A is willing to pay right now for the desired item 110A, but as is the case with human nature, this price is often variable with time and other factors. Similarly, a seller 108B may seek to sell a for sale item (FSI) 110B via EM 104. The seller 108B may seek a particular price (e.g., list price) for the FSI 1101B, but again, this price can be variable with time (e.g., the list price may lower with time, or increase with demand/shortness of supply). The desired item 110A and FSI 110B may be referred to herein generally as item 110.

Item 110 may include any goods or services that can be sold via EM 104. Example items 110 include, but are not limited to, shoes, purses, event tickets, vehicles, vacation packages, airline tickets, hotel stays, furniture, clothing, household, services, electronic goods, subscriptions, or automotive items. In some embodiments, an item 110 will be identical or similar to previously sold items on the EM 104. For example, multiple buyers and sellers may have consummated or may be in the process of consummating buy/sell transactions for a particular brand/model of a shoe (e.g., item 110). If an item 110 is unique, such as a one-of-a-kind lamp, then EM 104 may categorize the item 110 in the closest identifiable or related category such as lamps and/or household lighting or furnishings. EM 104 may track and generate an item history 113 for the item 110, which may include the specific brand/model and/or category.

The item history 113 may include a history of bids, offers, and sales transactions between various buyers and sellers on EM 104 for a good/service that is identical or deemed similar to or within the same category as item 110. In some embodiments, the item history 113 may include the various bid, offer, and sales prices, the time between listing and sales, the geographic locations of buyers and sellers, the conditions of products offered for sale, the season or time of year of the transactions (which can impact the demand or price, because certain items 110 are seasonal), etc. The item history 113 transactions can include any users of EM 104 who have engaged in buy/sell and/or bid/list transactions.

Rather than requiring a user 108 to manually try and monitor the hundreds, thousands, or even millions of transactions happening across EM 104 to try and find an ideal or acceptable price for buying/selling item 110, MCT 102 may automatically monitor EM 104, adjust prices on behalf of different users 110, and even complete buy/sell transactions on behalf of users 108 without their needing to perform any additional actions (beyond authorizing MCT 102 to perform the buy/sell transactions and/or price adjustments).

In some embodiments, MCT 102 may have access to the user history 106 and item history 113 data of EM 104. Using user history 106 and item history 113, MCT 102 may generate models or curves for individual buyers, sellers, and items, and based on these curves (and any applicable user feedback), MCT 102 may monitor EM 104 and adjust prices and complete sale/purchase transactions of items 110 on behalf of users 108.

In some embodiments, when a buyer wants to purchase a desired item 110A on EM 104, MCT 102 may generate both a buyer curve 112A and item curve 114 for the desired item 110A. The buyer curve 112A may be a model of the buyer's purchase patterns or behaviors in terms of the price the buyer 108A was willing to offer or pay for previously purchased, searched for, or bid-on items from EM 104 and/or the price adjustments that were made on the account of the buyer 108A. In some embodiments, price may be monitored as a percentage of the list or suggested retail price of an item 110, and the price adjustments may be monitored or tracked as percentage changes from the previous bid or list price. In some embodiments, MCT 102 may account for the condition of the items being purchased, search for, or bid-on by buyer 108A in generating the buyer curve 112A.

In some embodiments, MCT 102 may generate an item curve 114 based on previously bid-on, sold, listed items that are identical to or within the same category as item 110. Item curve 114 may be a general market curve, or supply/demand model indicating recent and historical trends with regard to the prices and times it has taken various sellers to sell the item 110 on marketplace. Item curve 114 may account for the time between when the listing was made live and the time when the sale was completed or the listing was cancelled, the various bids and changes in listing prices (which may include percentage changes and/or dollar amounts), the condition of the item 110, the ultimate sales price, and the difference (if any) between the ultimate sales price and the original list price or suggested retail price. MCT 102 may account for these and other factors in generating item curve 114. In some embodiments, item curve 114 may represent a current demand for an item 110 based on historical transaction and trend data.

In some embodiments, when buyer 108A wants to purchase a desired item 110A, the buyer 108A may have the option of using MCT 102 to complete or assist with the purchase transaction. If the buyer 108A has opted-in to using MCT 102, MCT 102 may retrieve the buyer history 106A and item history 113 information from EM 104 and automatically generate buyer curve 112A and item curve 114.

In some embodiments, the functionality of MCT 102 may be integrated within or as part of EM 104. In some embodiments, MCT 102 may operate as a plug-in or optional add-on feature accessible to users of one or more EMs 104. In some embodiments, MCT 102 may be operable across different EMs 104 and use the history information from those different EMs to generate the curves for a selected one or more EMs on which a user 110 currently wants to transact for an item 110.

In some embodiments, MCT 102 may generate a purchase curve 116A based on a combination of buyer curve 112A and item curve 114. For example, buyer curve 112A may be used as the foundational curve for buyer 108A, and may be adjusted based on item curve 114. For example, if item curve 114 indicates that the desired item 110A is in high demand, buyer curve 112A may be adjusted to increase the likely price buyer 108A may have to pay to purchase the desired item 110A, and/or shorten the timeframe (e.g., because those products in high demand are often sold quickly).

Conversely, if the item curve 114 indicates that the desired item 110A is in low demand or out-of-season, then the likely price as indicated by purchase curve 116A may be reduced from buyer curve 112A. Item curve 114 may indicate low demand based on the sales price being less than the initial requested or suggested retail prices, and/or long listing times and/or an increased volume of unsold products, active listings, or cancelled listings.

In some embodiments, item curve 114 may indicate neutral demand if there may not be enough item history 113 data to generate item curve 114 if it is a new product that has just been released and there is no basis for categorization or comparison, in which case buyer curve 112A would not be adjusted based on item curve 114. Or, for example, neutral demand may be an item curve 114 that is on par with a general market or category curve, within a threshold range (e.g., in terms of prices, volume, transactions closing, and/or active listings).

In some embodiments, neutral demand may indicate that current demand is in line with historical demand over a specified time period. For example, if over the previous five years, an average of five dining tables a month sold on EM 104, then a range of 4-6 dining tables in recent months may indicate neutral demand, less than 4 may indicate low or weak demand, and more than 6 may indicate high demand from item curve 114.

In some embodiments, MCT 102 may identify a price for item 110 based on a user curve 112. For example, buyer curve 112A may indicate that buyer 108A has on average paid 85% of a retail or list price for previously purchased items. Then, for example, for a $100 listed or retail price desired item 110A, buyer curve 112A may indicate that buyer 108A would be willing to pay $85. Similarly, seller curve 112B may indicate a percentage of an original list price that seller 108B was willing to sell previously sold items, which may be for example 90%, which would indicate a $90 list price for a $100 FSI 110B.

In some embodiments, based on item curve 114, the indicated price for users 108 may be modified. For example, if the item curve 114 indicates the item 110 is in high demand, this may result in a percentage increase of the price. For example, high demand may indicate a 20% price increase forbid prices and list prices, and low demand may indicate a 10% price decrease. In continuing the example above, high demand for the desired item 110A may cause MCT 102 to increase the projected bid price for buyer 108A from $85 to $102 (e.g., $100*1.2*0.85), and low demand may reduce the likely sell price for seller 108B from $90 to $81 ($100*0.9*0.9).

In some embodiments, a user curve 112 (e.g., buyer curve 112A, seller curve 112B) may be used to adjust an item curve 114. Similar to what was described above with item curve 114, user curve 112 may indicate whether the user 108 is an upper-range user (e.g., who conducts buy/sell transactions on the higher price side of a range of prices for item 110), a lower-range user (e.g., who conducts buy/sell transactions on the lower price side of a range of prices for item 110), or a neutral or mid-range user (e.g., who conducts buy/sell transactions on the middle range or near the average of sales prices for item 110). In some embodiments, the item curve 114 may be used to generate the initial price, which may then be adjusted up or down by a percentage of the price based on which range the particular user 108 is categorized.

In some embodiments, buyer curve 112A may include a chart with the percentage of the list price illustrated on a y-axis of the chart and the condition of the one or more items purchased on an x-axis of the chart. In some embodiments, seller curve 112B may include a chart with the percentage of the list price illustrated on a y-axis of the chart and time since listing on an x-axis of the chart. In some embodiments, seller curve 112 may indicate a relationship between a percentage of an original list price the seller was willing to sell one or more items sold through the marketplace and a time required to sell the one or more items through the marketplace.

In some embodiments, MCT 102 may provide a display curve 121 via a user interface 118. The display curve 121 may be purchase curve 116 (e.g., item curve 114 adjusted by buyer curve 112A or buyer curve 112A adjusted by item curve 114) to buyer 108A for approval 122 or adjustment 120. In some embodiments, the user interface 118 may include the buyer curve 112A, the item curve 114, and/or the purchase curve 116A as display curve 121, and a description and/or image of the desired item 110A. The buyer 108A may then adjust the purchase curve 116A.

In some embodiments, the user interface 118 may initially only display the purchase curve 116A (but not the buyer curve 112A or the item curve 114) for a buyer 108A. However, the buyer 108A may request to see the original buyer curve 112A and/or item curve 114 by selecting a 'more info' button or other user interface 118 command. Then, for example, in response to the user selection, MCT 102 may simultaneously display the buyer curve 112A, item curve 114, and purchase curve 116A for buyer 108A via user interface 118.

Buyer 108A may review the purchase curve 116A and either provide an adjustment 120 or approval 122 of the purchase curve 116A directly from user interface 118. For example, buyer 108A may provide adjustment 120 by using a mouse or touchscreen device to drag and adjust the purchase curve 116A to fit the buyer's preferences.

Or, for example, buyer 108A may enter a maximum price and/or corresponding or maximum time threshold the buyer 108A is willing to wait to make the purchase. For example, the purchase curve 116A may indicate that the buyer 108A may have to pay 95% of the retail price (or $1000) to purchase the desired item 110A within 2 weeks. The buyer 108A may then adjust the maximum price in dollars or percentage that the buyer 108A is willing to pay. For example, the buyer 108A may indicate a maximum price of 80%, but then after 2 weeks, the buyer 108A may increase the maximum price to 90% if no purchase has been made. This may be the case if the buyer 108A needs or wants the desired item 110A within 3 weeks.

Or, for example, purchase curve 116A may indicate a price-time variance from when a new listing for the desired item 110A was activated on EM 104. In which case the longer the listing has been active, the less price a buyer would likely have to pay to complete a purchase transaction.

In some embodiments, user interface 118 may include a confidence score 123. Confidence score 123 may be a MCT 102 generated confidence score of how likely MCT 102 predicts the resultant transaction curve 116 (e.g., 116A or 116B) to result in a completed sales transaction. For example, the further the buyer 108A reduces the bid price below a predicted or historical price for item 110, the lower the confidence score 123 may drop. In some embodiments, MCT 102 may perform real-time updates to confidence score 123 in response to any user adjustments 120. In some embodiments, confidence score 123 may be a percentage indicating a likelihood of a sale based on the current transaction curve 116.

As just noted, buyer 108A may provide an adjustment 120 to the purchase curve 116A, and subsequently approve 122 the adjusted purchase curve 116A. Or, the buyer 108A may approve 122 the purchase curve 116A without any adjustments 120. In some embodiments, this adjustment 120 may be received as negative feedback from the buyer 108A and may be used to improve machine-learning capabilities in processing subsequent curves or buy/sell requests, and an approval 122 without adjustment 122 may be received as positive feedback to a backend machine learning system that may be used by MCT 102 in generating buyer curve 112A, item curve 114, and/or purchase curve 116A.

In some embodiments, approval 122 may include an indication as to what action MCT 102 should perform when the desired item 110A is found on EM 104 within the bounds of an approved purchase curve 116A. In some embodiments, the approval 122 may include an authorization for MCT 102 to adjust bid/list prices and/or purchase desired item 110A on behalf of a user 108 (with or without prior or subsequent user notification).

In some embodiments, approval 122 may include an indication to text, call, email, transmit in-app messages; alerts to a web browser, or any other electronic notifications that may be received by the buyer 108A when the desired item 110A is found within the bounds of purchase curve 116A. This notification to the buyer 108A may allow the buyer to respond with an approval for MCT 102 to purchase the desired item 110A on behalf of buyer 108A (using the buyer's saved credit card or other payment information), or may allow the buyer 108A the opportunity to log in to the EM 104 with a link (that was provided in the notification) and purchase the desired item 110A directly on EM 104.

Similar to what was described above with respect to the generation of a purchase curve 116A for a buyer 108A, MCT 102 may generate a sales curve 116B for a seller 108B of a FSI 110B. The seller curve 112B may be generated based on the seller history 106B and may indicate past listing price increases/reductions/sales/listings with regards to the seller's activities on EM 104. Item curve 114 may include a sales/listing history of similar or identical items to FSI 110B on EM 104 and may indicate a current demand for FSI 110B.

In some embodiments, MCT 102 may generate a sales curve 116B by adjusting seller curve 112B by item curve 114, or by adjusting item curve 114 based on seller curve 112B, similar to what was described above for buyer 108A, buyer curve 112A, and purchase curve 112A. Then, through user interface 118, seller 108B may provide an adjustment 120 and/or approval 122 of the sales curve 116B. MCT 102 may receive any input provided by seller 108B responsive to sales curve 116B as feedback to improve a machine learning engine used to generate item curve 114, seller curve 112B, and/or sales curve 116B. Similar to what was described above, seller 108B may also be provided a confidence score 123 which is updated in real-time based on any adjustments 120.

A market agent 124 may monitor EM 104 for item 110 based on the approved transaction curve 116 (e.g., purchase curve 116A or sales curve 116B). Market agent 124, if so authorized, may adjust buy or bid prices for buyer 108A and list prices for seller 108B based on the respective transaction curve 116. Market agent 124 may also notify user 108 when a transaction has occurred, or a price has been adjusted.

In some embodiments, MCT 102 may allow buyer 108A to specify a minimum seller rating (e.g. 3 stars) from which buyer 108A only wants to buy. Then, for example, market agent 124 identify and track only those sellers satisfying the buyer's seller rating requirements. Similarly, a seller 108B may indicate a minimum buyer rating to whom seller 108B is only willing to sell. Then, for example, market agent 124 identify and track only those buyers satisfying the seller's buyer rating requirements. In some embodiments, this rating for buyers or sellers may be received as adjustment 120 via user interface 118.

In some embodiments, while a purchase and/or sales transaction for an item 110 is still outstanding, live, or active, MCT 102 may periodically regenerate item curve 114 and/or user curves 112. Then, for example, if there is a change in either curve that may impact the transaction curve 116, MCT 102 may notify the respective user 108. In some embodiments, MCT 102 may automatically adjust the transaction curve 116, and provide user 108 with access to the new transaction curve 116 for approval 122, adjustment 120, and/or simply reference. In some embodiments, the notification may request user 108 to login and approve to new transaction curve 116 before being made active. In some embodiments, a user 108 may login and manually provide a new bid/list price and override the previously-approved transaction curve 116.

When a sale is completed, the listing is removed, or a threshold period of time has lapsed, market agent 124 may stop monitoring EM 104 based on the previously approved transaction curve 116. In some embodiments, MCT 102 may generate new curves 114, 112, 116 and request new instructions from a user 108 for the same or different item 110.

Figure 2:
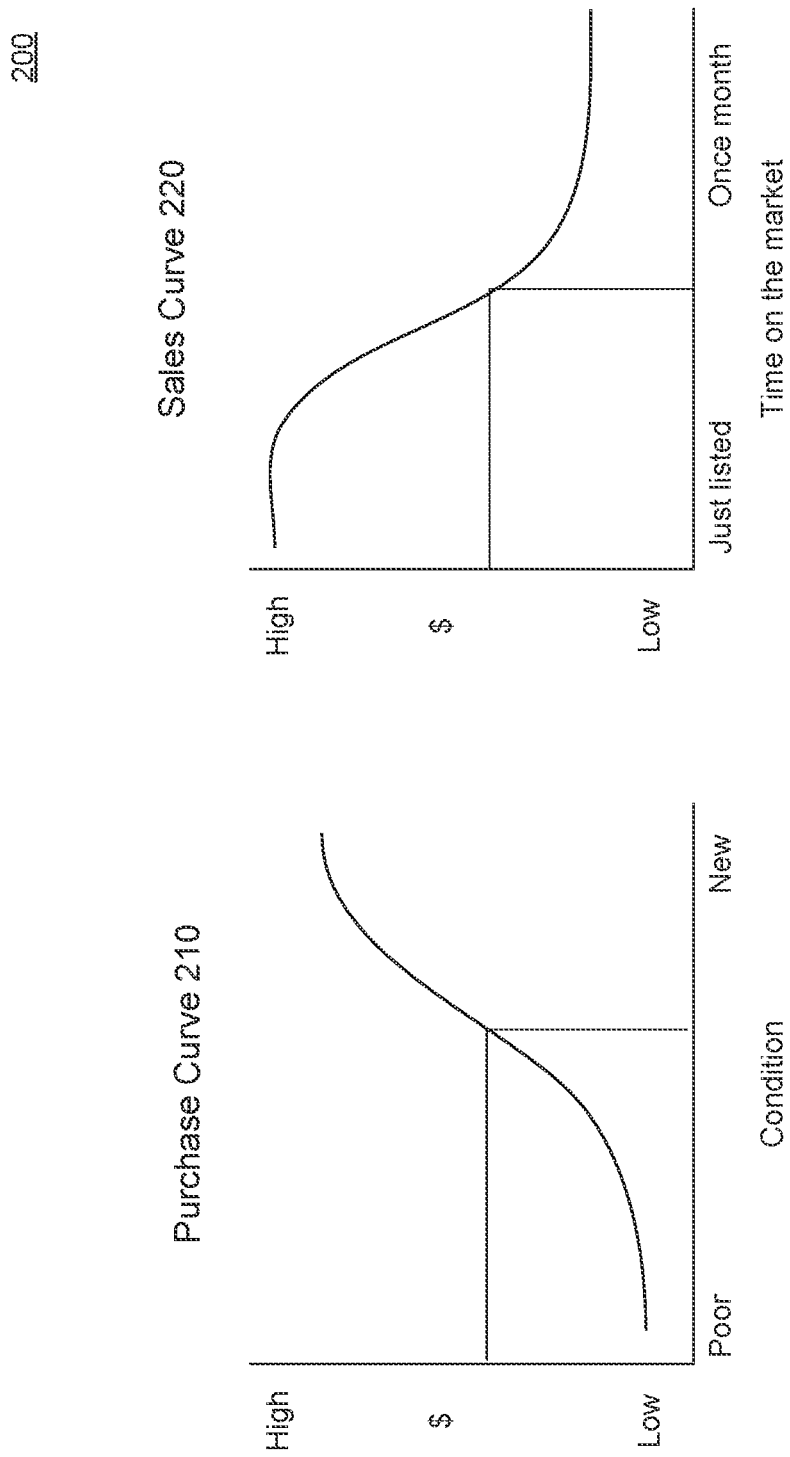
FIG. 2 is a block diagram illustrating an example transaction curves, according to some embodiments.

FIG. 2 is a block diagram 200 illustrating an example transaction curves 116, according to some embodiments. The willingness of a buyer 108A and a seller 108B to complete a sales transaction can be affected by any different number of factors including a time of year or season, their personal financial situation and sensitivities, the type or category of item 110 for which a transaction is sought, their personal needs, the amount of time that has passed, and a myriad of other factors. MCT 102 may monitor and model these and other variables in determining how they influence the willingness of a buyer 108A and/or seller 108B to make a transaction in generating various models or curves. MCT 102 may then use these generate curves to help close sales transactions on behalf of the users 108.

The diagram 200 illustrates simple examples of how a single variable can influence the willingness of a user 108 to buy/sell an item 110. With regard to the purchase curve 210, on the buyer side, the condition of the item may impact the buyer's willingness to pay various prices With regard to the sales curve 220, on the seller's side, the time since the listing has gone active may impact the listing price. But in actuality, there may be hundreds of variables and dimensions at play in generating the curves 210 and 220, which are provided as simple, non-limiting examples.

In the example purchase curve 210 illustrated, the rectangular line box illustrates that because the item 110 was in fair condition, there was a need to wait a period of time before the willingness of the buyer 108A was to purchase the item 110 in the fair condition (the buyer may have preferred to initially purchase the item in a new or like-new condition).

In some embodiments, the buyer curve 112A may represent a relationship between a percentage of a list price the buyer paid for one or more items purchased through EM 104 and a condition of the one or more items purchased through EM 104. For example, different buyers 108A may have histories of paying different percentages of list or retail prices of an item based on the relative condition of the items. In some embodiments, item curve 114 may account for the percentage of list or retail prices paid for item 110A based on the varying conditions of the listed items in closed sales transactions.

Similarly, in the example sales curve 220 illustrated, the rectangular line box illustrates that a period of time was needed to wait before the willingness of the seller 108B was to reduce the price of the item 110 to a price at which a buyer was willing to buy it (the seller 108B may have preferred to initially sell the item 110 at a higher price). When market agent 124 identifies a correspondence between condition and price between an account of a buyer 108A and an account of a seller 108B, a sales transaction may be completed by market agent 124 on behalf of the users 108.

Figure 3A:
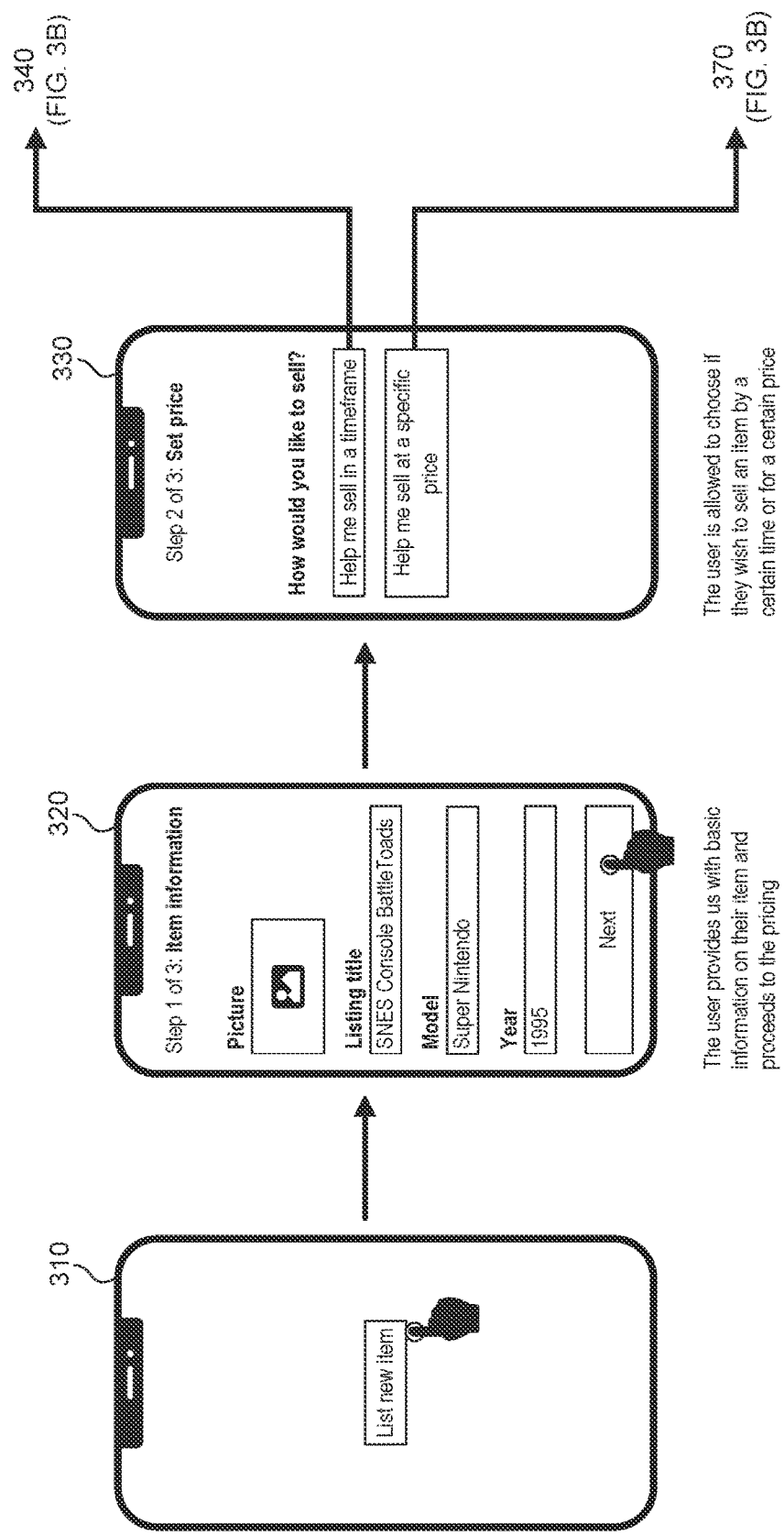
FIGS. 3A and 3B illustrate a block diagram of example interactions between a seller and a user interface of MCT, according to some embodiments.
Figure 3B:
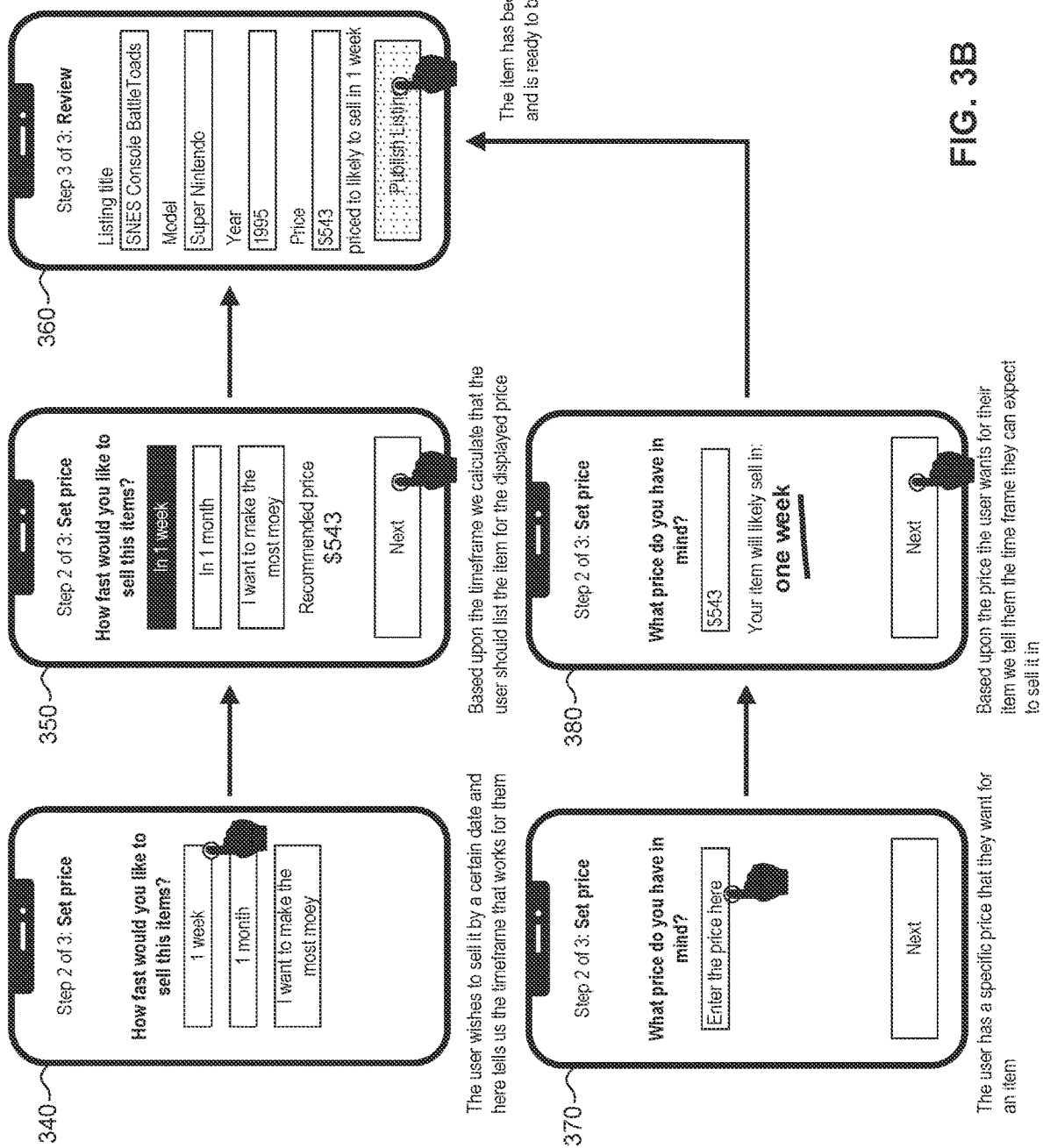

FIGS. 3A and 3B illustrate a block diagram 300 of example interactions between a seller 108B and a user interface 118 of MCT 102, according to some embodiments.

At 310, a seller 108B may select the option to list a new FSI 110B. At 320, the seller 108B may provide information for the listing of the FSI 110B, such as basic information and/or pictures of the FSI 110B, and a title of the listing.

At 330, MCT 102 may provide a user an option of selling the FSI 110B within a particular time frame, or at a specific price. In some embodiments, MCT 102 may provide an option for a user to get help with both timeframe and price.

At 340, if the user selected the timeframe option (at 330), MCT 102 may provide the user options of selecting any of several predefined time frames (which may be based on item curve 114 or item history 113 indicating how long it has taken similar products to sell), maximizing profit, and/or entering a custom time frame (not shown).

At 350, if the user selected the 1 week option, MCT 102 may calculate a list price based on generating a sales curve 116B which may be based on item curve 114 (using the information received at 320) and/or seller curve 112B. At 360, the user may adjust the sales price or accept the sales price and activate the listing.

At 370, if the user selected help with a specific price at 330, the seller 108B may enter a specific listing price. Then, for example, based on item curve 114, MCT 102 may generate a predicted timeframe in how long it will likely take to sell the FSI 110B at that price at 380. In some embodiments, MCT 102 may provide a confidence score 123 with the predicted time interval, and user may adjust the price which may adjust the time frame while maintaining the same or similar confidence score 123. At 360, the user may adjust the sales price or accept the sales price and activate the listing.

Figure 4:
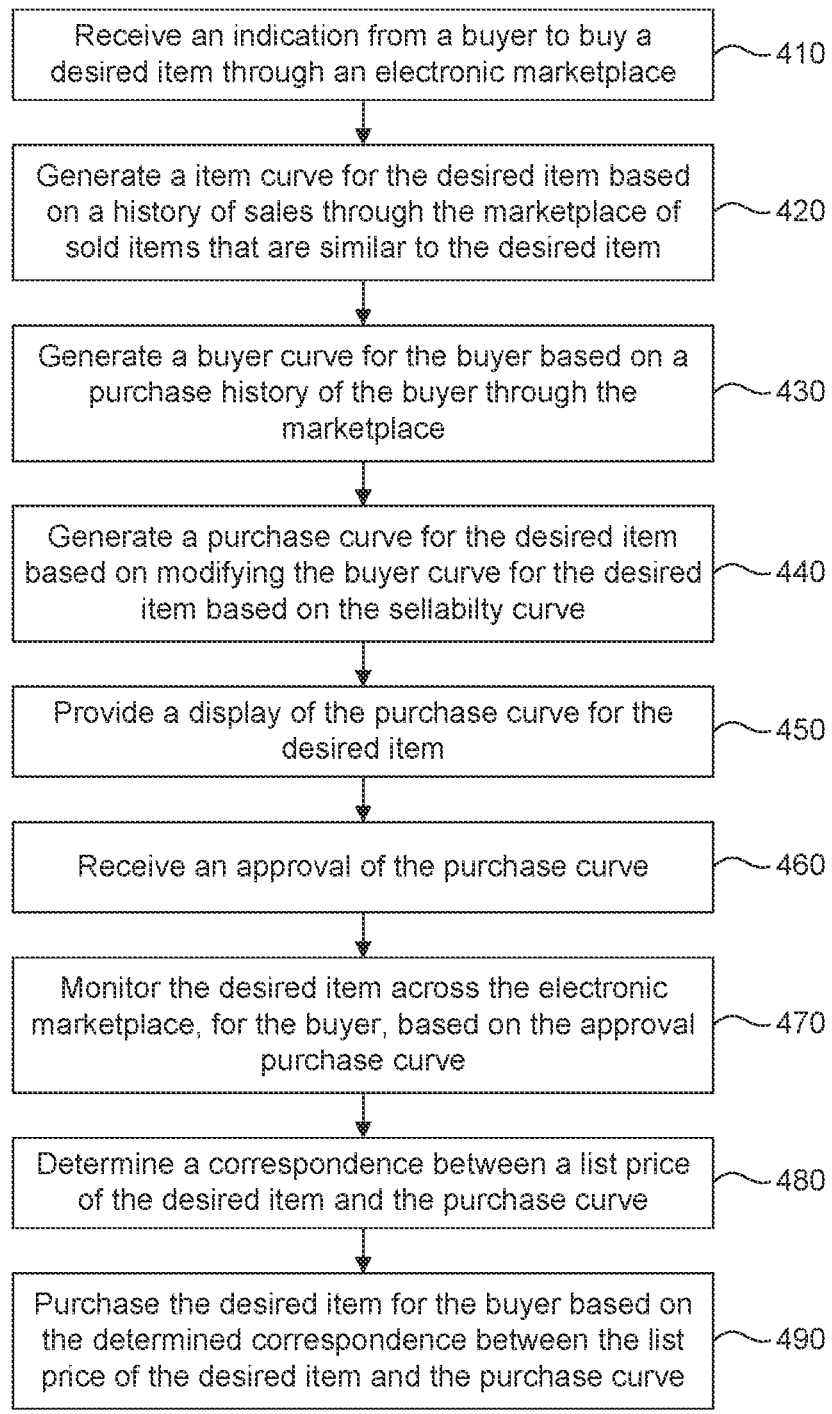
FIG. 4 is a flowchart illustrating a process for a purchase transaction as performed by a marketplace curve transaction system (MCT), according to some embodiments.

FIG. 4 is a flowchart illustrating a process 400 for a purchase transaction as performed by a marketplace curve transaction system (MCT) 102, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to the figures.

In 410, an indication to buy a desired item through an electronic marketplace is received from a buyer. For example, buyer 108A may perform one or more searches for a desired item 110A on EM 104. MCT 102 may interpret the one or more searches as indication to buy desired item 110A. In some embodiments, a minimum threshold such as number of searches (e.g., exceeding a threshold number), time searching (e.g., exceeding at threshold time for a particular item 110A), and/or listings clicked regarding desired item 110A may be used as buy indications.

In some embodiments, MCT 102 may generate or have access to an inventory of a user 108A. For example, MCT 102 may have access to previous purchases made via EM 104, or may be granted access to the email of user 108 and may be able to identify purchases made from EM 104 or other websites based on email receipts. MCT 102 may then be able to identify purchase patterns, and make recommendations for purchases of new items and/or sales of previously purchased items.

In 420, an item curve for the desired item is generated based on a history of sales through the marketplace of sold items that are similar to the desired item. For example, MCT 102 may retrieve item history 113 and generate item curve 114 for desired item 110A (and/or category). In some embodiments, the item curve 114 may indicate whether the desired item 110A is in high demand, low demand, or neutral demand.

In 430, a buyer curve for the buyer is generated based on a purchase history of the buyer through the marketplace. For example, MCT 102 may retrieve buyer history 106A and generate buyer curve 112A for the buyer 108A. The buyer curve 112A may indicate what percentage of a sales, list, or retail price buyer 108A has paid for previous purchases and/or may now be willing or likely to pay for desired items 110A.

In 440, a purchase curve for the desired item is generated based on modifying the buyer curve for the desired item based on the sellabilty curve. For example, item curve 114 may be modified based on buyer curve 114 (which may indicate the purchase tendencies of buyer 108A as being in upper, middle, or lower range of prices) to generate purchase curve 116A. Or, for example, buyer curve 114 may be modified based on item curve 114 (which may be a sellability or demand curve) to generate purchase curve 116A.

In 450, a display of the purchase curve for the desired item is provided. For example, user interface 118 may include a display curve 121 including purchase curve 116A, buyer curve 112A and/or item curve 114.

In 460, an approval of the purchase curve is received. For example, MCT 102 may receive an approval 122 of the display curve 121 via the user interface 118.

In 470, the desired item is monitored across the electronic marketplace, for the buyer, based on the approved purchase curve. For example, market agent 124 may monitor EM 104 based on the approved purchase curve 116A to identify a price (and condition) of desired items 110A that the buyer 108A has approved or deemed acceptable. In some embodiments, market agent 124 may change bid prices for buyer 108A based on purchase curve 116A, which may include bid price increases or bid price decreases, which may be triggered through the passage of threshold periods of time as indicated by purchase curve 116A. For example, purchase curve 116A may indicate to increase the bid price by 10% after 1 week if no purchase of desired item 110A has been made.

In 480, a correspondence between a list price of the desired item and the purchase curve is determined. For example, market agent 124 may determine that there is a listing on EM 104 for desired item 110A that satisfies purchase curve 116A.

In 490, the desired item is purchased for the buyer based on the determined correspondence between the list price of the desired item and the purchase curve. For example, market agent 124 may execute the purchase of desired item 110A on behalf of buyer 108A using financial or payment information that may have already been stored in the account of buyer 108A. MCT 102 may then transmit a notification to the email address, phone, and/or other account of buyer 108A indicating that the purchase has been completed, which may include purchase information (e.g., link to the listing, buyer name, estimated ship or arrival date, price paid, condition, etc.).

Figure 5:
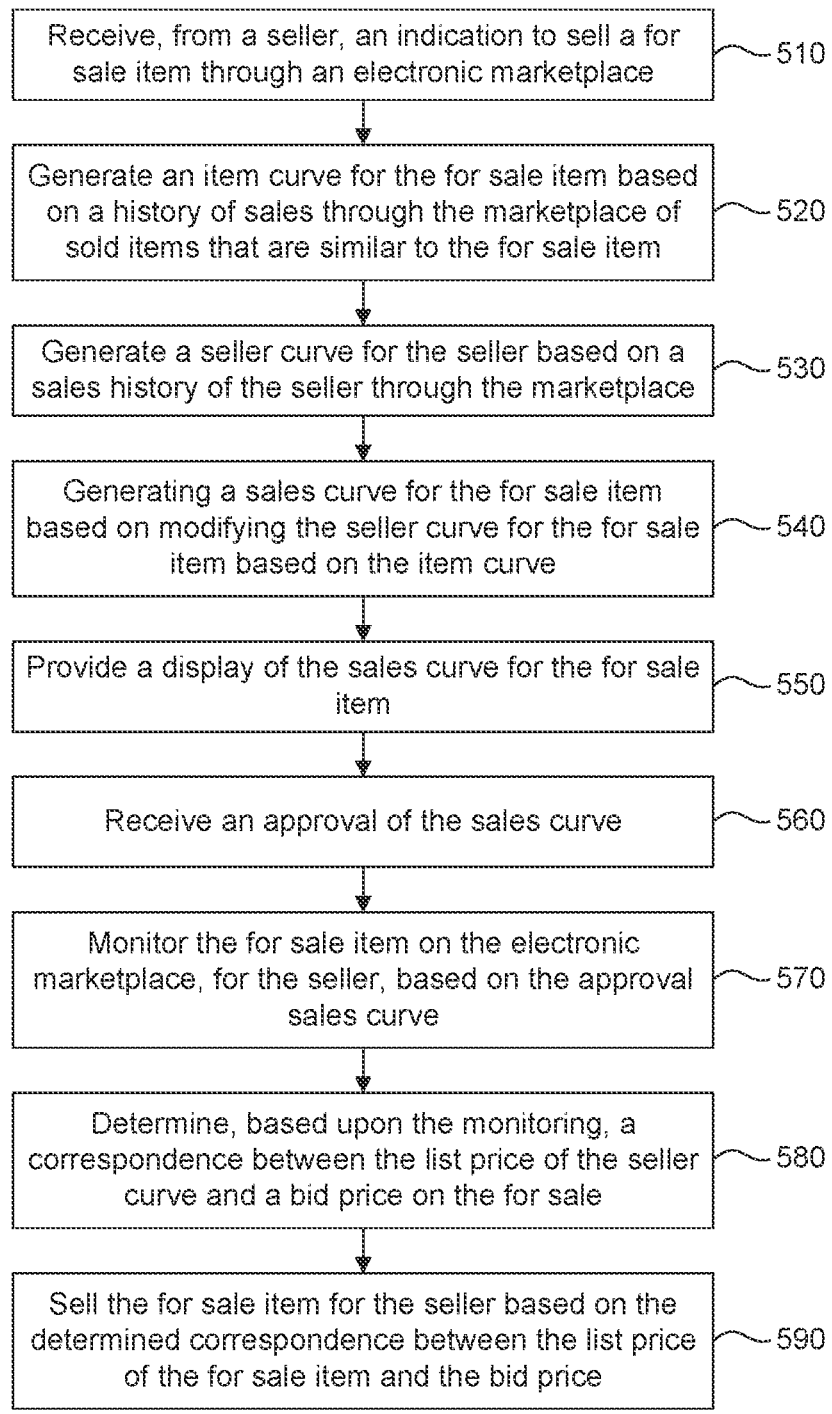
FIG. 5 is a flowchart illustrating a process for a sales transaction as performed by a marketplace curve transaction system (MCT), according to some embodiments.

FIG. 5 is a flowchart illustrating a process 500 for a sales transaction as performed by a marketplace curve transaction system (MCT) 102, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to the figures.

In 510, an indication to sell a for sale item through an electronic marketplace is received from a seller. For example, seller 108B may select an option to create a new listing for a for sale item (FSI) 110B.

In 520, an item curve for the for sale item is generated based on a history of sales through the marketplace of sold items that are similar to the for sale item. For example, the item history 113 for FSI 110B may be retrieved or accessed and used to generate item curve 114. In some embodiments, the item curve 114 may indicate whether the desired item 110A is in high demand, low demand, or neutral demand.

In 530, a seller curve for the seller is generated based on a sales history of the seller through the marketplace. For example, the seller curve 112B may indicate over time how willing a seller 108B is to change (reduce or increase) their list prices for items they have listed and/or sold through EM 104. In some embodiment, the seller curve 112B may indicate how price flexible or inflexible the seller 108B has been with past items.

In 540, a sales curve for the for sale item is generated based on modifying the seller curve for the for sale item based on the item curve. For example, MCT 102 may combine seller curve 112B and item curve 114 to generate sales curve 116B for FSI 110B being sold by seller 108B. In some embodiments, the seller curve 112B may be applied to a current retail or average sales price for FSI 110B (which may be based in part on a condition of FSI 110B), to determine a likely price trend for selling FSI 110B via EM 104. Then, based on the item curve 114, this price and/or timeframe may be adjusted if the FSI 110B is in high demand or low demand. In some embodiments, neutral demand may result in no change in seller curve 112B, and sales curve 116B may be identical to seller curve 112B.

In 550, a display of the sales curve for the for sale item is provided. For example, MCT 102 may provide a display curve 121 including one or more of sales curve 116B, seller curve 112B, and item curve 114 via user interface 118 (which may be displayed on a user device such as a mobile phone, or tablet/laptop computer).

In 560, an approval of the sales curve is received. For example, MCT 102 may receive approval 122 of the displayed curve 121 (e.g., sales curve 116B). In some embodiments, MCT 102 may receive various adjustments 120 to display curve 121 prior to receiving approval 120.

In 570, the for sale item is monitored on the electronic marketplace based on the approved sales curve. For example, market agent 124 may monitor various bids on a listing of FSI 110B over time, and may adjust the list price in accordance with sales curve 116B (if needed). These price adjustments may occur independent of or without any further seller 108B instruction (after approval 122) of sales curve 116B.

In 580, a correspondence between the list price of the seller curve and a bid price on the for sale is determined. For example, market agent 124 may determine that a bid price matches a sales or list price of FSI 110B.

In 590, the for sale item is sold for the seller based on the determined correspondence between the list price of the for sale item and the bid price. For example, MCT 102 may complete a sale of FSI 110B to a buyer who provided the bid price that matches or exceeds a list price of FSI 110B.

Figure 6:
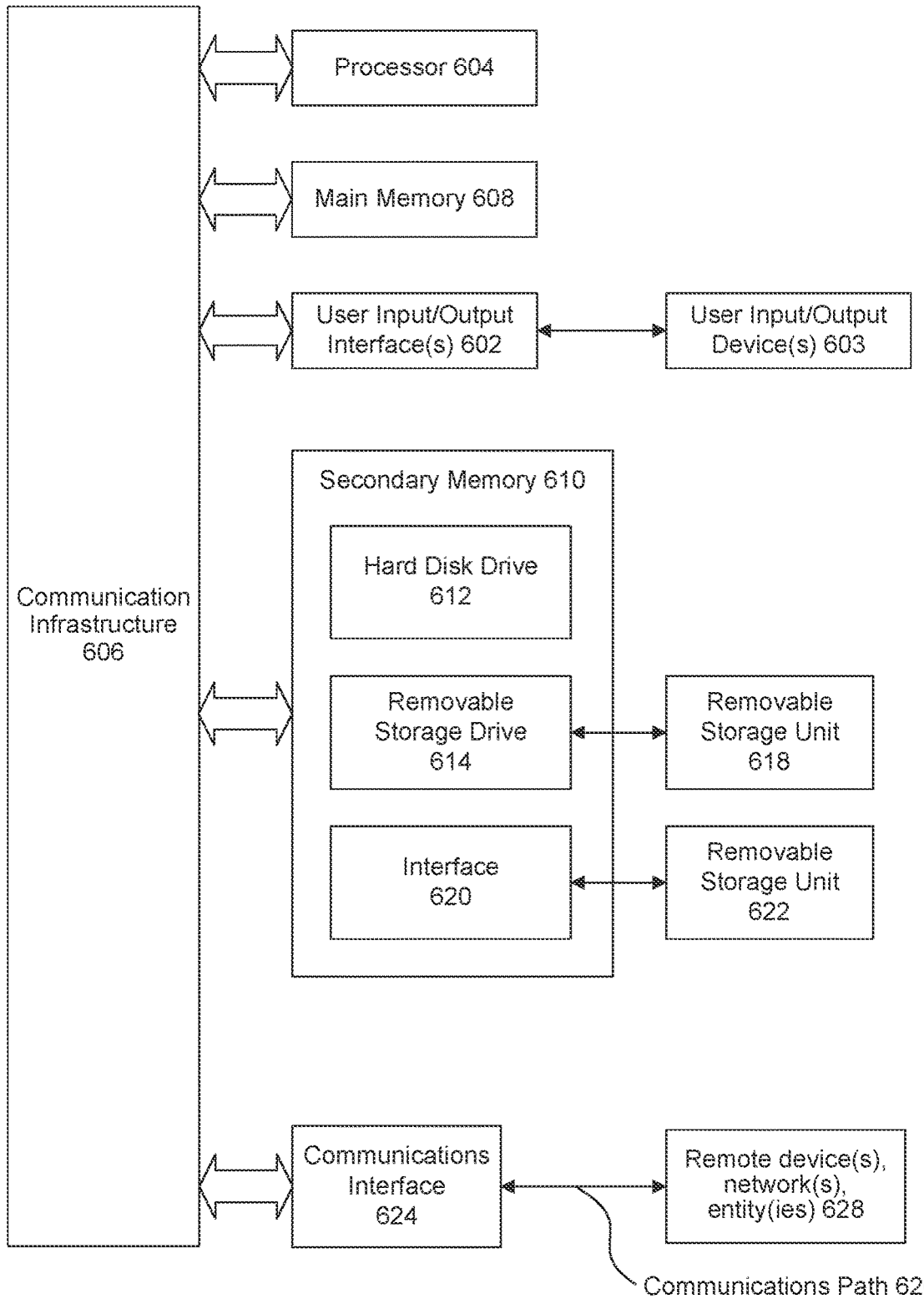
FIG. 6 illustrates an example computer system useful for implementing various embodiments.

Various embodiments and/or components therein can be implemented, for example, using one or more computer systems, such as computer system 600 shown in FIG. 6. Computer system 600 can be any computer or computing device capable of performing the functions described herein. For example, one or more computer systems 600 can be used to implement any embodiments, and/or any combination or sub-combination thereof.

Computer system 600 includes one or more processors (also called central processing units, or CPUs), such as a processor 604. Processor 604 is connected to a communication infrastructure or bus 606. Computer system 600 may represent or comprise one or more systems on chip (SOC).

One or more processors 604 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, memory card, and/any other computer data storage device. Removable storage drive 614 reads from and/or writes to removable storage unit 618 in a well-known manner.

According to an exemplary embodiment, secondary memory 610 can include other means, instrumentalities or other approaches for allowing computer programs and/or other instructions and/or data to be accessed by computer system 600. Such means, instrumentalities or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

In some embodiments, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

receiving, from a seller, an indication to sell a for sale item through an electronic marketplace;

generating an item curve for the for sale item based on a history of sales through the electronic marketplace of sold items that are similar to the for sale item, the item curve indicating whether the for sale item is in high demand, low demand, or neutral demand;

generating a seller curve for the seller based on a sales history of the seller through the electronic marketplace, the sales history comprising a list of items offered for sale and dates of sales, cancellations, and price adjustments;

generating, by a machine learning system, a sales curve for the for sale item based on modifying the seller curve for the for sale item based on the item curve, wherein the modifying comprises one of:
  based on the item curve indicating the for sale item is in high demand, increasing a list price indicated by the seller curve, and
  based on the item curve indicating the for sale item is in low demand, decreasing the list price indicated by the seller curve;

providing, via a user interface, a display of the sales curve for the for sale item;

receiving, via the user interface, a response to the sales curve, wherein the response comprises one of an adjustment or an approval of the sales curve by the seller;

modifying the machine learning system based on the response to the sales curve, wherein the adjustment comprises negative feedback and the approval comprises positive feedback to the machine learning system, and where the negative feedback and the positive feedback are used by the machine learning system in generating subsequent sales curves;

monitoring the for sale item on the electronic marketplace, for the seller, based on the approval of the sales curve;

determining, based upon the monitoring, a correspondence between the list price of the seller curve and a bid price on the for sale item; and selling the for sale item for the seller based on the correspondence between the list price of the for sale item and the bid price.

2. The method of claim 1, wherein the seller curve comprises a chart with a percentage of the list price illustrated on a y-axis of the chart and time since listing on an x-axis of the chart.

3. The method of claim 1, wherein the item curve comprises a relationship between a range of sales prices for the sold items and a length of time that was required to sell the sold items at the range of sales prices.

4. The method of claim 1, further comprising:
receiving, via the user interface, an indication of a minimum buyer rating from the seller;
identifying a subset of a plurality of different buyers that satisfy the minimum buyer rating, wherein one or more of the plurality of different buyers do not satisfy the minimum buyer rating; and
monitoring only the subset of the plurality of different buyers that satisfy the minimum buyer rating.

5. The method of claim 1, wherein the providing comprises providing the item curve, the seller curve, and the sales curve for simultaneous simultaneously display via the user interface.

6. The method of claim 1, further comprising:
receiving, via the user interface, an adjustment of the sales curve from the seller; and
receiving an approval of the sales curve including the adjustment, wherein the monitoring comprises monitoring the for sale item across the electronic marketplace, for a buyer, based on the sales curve including the adjustment.

7. The method of claim 1, wherein the seller curve comprises a relationship between a percentage of an original list price the seller was willing to sell one or more items sold through the electronic marketplace and a time required to sell the one or more items through the electronic marketplace.

8. The method of claim 1, wherein the monitoring comprises:
determining a period of time has passed; and
modifying the list price of the for sale item in accordance with the approval of the sales curve independent of any subsequent seller interaction.

9. The method of claim 1, wherein the sales history indicates which of the list of items were offered for sale in a fixed priced sale and which of the list of items were offered in an auction-style sale.

10. A system comprising at least one processor, the at least one processor configured to perform operations comprising:
receiving, from a seller, an indication to sell a for sale item through an electronic marketplace;
generating an item curve for the for sale item based on a history of sales through the electronic marketplace of sold items that are similar to the for sale item, the item curve indicating whether the for sale item is in high demand, low demand, or neutral demand;
generating a seller curve for the seller based on a sales history of the seller through the electronic marketplace, the sales history comprising a list of items offered for sale and dates of sales, cancellations, and price adjustments;
generating, by a machine learning system, a sales curve for the for sale item based on modifying the seller curve for the for sale item based on the item curve, wherein the modifying comprises one of:
based on the item curve indicating the for sale item is in high demand, increasing a list price indicated by the seller curve, and
based on the item curve indicating the for sale item is in low demand, decreasing the list price indicated by the seller curve;
providing, via a user interface, a display of the sales curve for the for sale item;
receiving, via the user interface, a response to the sales curve, wherein the response comprises one of an adjustment or an approval of the sales curve by the seller;
modifying the machine learning system based on the response to the sales curve, wherein the adjustment comprises negative feedback and the approval comprises positive feedback to the machine learning system, and where the negative feedback and the positive feedback are used by the machine learning system in generating subsequent sales curves;
monitoring the for sale item on the electronic marketplace, for the seller, based on the approval of the sales curve;
determining, based upon the monitoring, a correspondence between the list price of the seller curve and a bid price on the for sale; and
selling the for sale item for the seller based on the correspondence between the list price of the for sale item and the bid price.

11. The system of claim 10, wherein the seller curve comprises a chart with a percentage of the list price illustrated on a y-axis of the chart and time since listing on an x-axis of the chart.

12. The system of claim 10, wherein the item curve comprises a relationship between a range of sales prices for the sold items and a length of time that was required to sell the sold items at the range of sales prices.

13. The system of claim 10, the operations further comprising:
receiving, via the user interface, an indication of a minimum buyer rating from the seller;
identifying a subset of a plurality of different buyers that satisfy the minimum buyer rating, wherein one or more of the plurality of different buyers do not satisfy the minimum buyer rating; and
monitoring only the subset of the plurality of different buyers that satisfy the minimum buyer rating.

14. The system of claim 10, wherein the providing comprises providing the item curve, the seller curve, and the sales curve for simultaneous display via the user interface.

15. The system of claim 10, the operations further comprising:
receiving, via the user interface, an adjustment of the sales curve from the seller; and
receiving an approval of the sales curve including the adjustment, wherein the monitoring comprises monitoring the for sale item across the electronic marketplace, for a buyer, based on the sales curve including the adjustment.

16. The system of claim 10, wherein the seller curve comprises a relationship between a percentage of an original list price the seller was willing to sell one or more items sold through the electronic marketplace and a time required to sell the one or more items through the electronic marketplace.

17. The system of claim 10, wherein the monitoring comprises:
   determining a period of time has passed; and
   modifying the list price of the for sale item in accordance with the approval of the sales curve independent of any subsequent seller interaction.

18. A non-transitory computer-readable medium having instructions stored thereon that, when executed by at least one computing device, cause the at least one computing device to perform operations comprising:
   receiving, from a seller, an indication to sell a for sale item through an electronic marketplace;
   generating an item curve for the for sale item based on a history of sales through the electronic marketplace of sold items that are similar to the for sale item, the item curve indicating whether the for sale item is in high demand, low demand, or neutral demand;
   generating a seller curve for the seller based on a sales history of the seller through the electronic marketplace, the sales history comprising a list of items offered for sale and dates of sales, cancellations, and price adjustments;
   generating, by a machine learning system, a sales curve for the for sale item based on modifying the seller curve for the for sale item based on the item curve, wherein the modifying comprises one of:
      based on the item curve indicating the for sale item is in high demand, increasing a list price indicated by the seller curve, and
      based on the item curve indicating the for sale item is in low demand, decreasing the list price indicated by the seller curve;
   providing, via a user interface, a display of the sales curve for the for sale item;
   receiving, via the user interface, a response to the sales curve, wherein the response comprises one of an adjustment or an approval of the sales curve by the seller;
   modifying the machine learning system based on the response to the sales curve, wherein the adjustment comprises negative feedback and the approval comprises positive feedback to the machine learning system, and where the negative feedback and the positive feedback are used by the machine learning system in generating subsequent sales curves;
   monitoring the for sale item on the electronic marketplace, for the seller, based on the approval of the sales curve;
   determining, based upon the monitoring, a correspondence between the list price of the seller curve and a bid price on the for sale item; and
   selling the for sale item for the seller based on the correspondence between the list price of the for sale item and the bid price.

19. The non-transitory computer-readable medium of claim 18, wherein the item curve comprises a relationship between a range of sales prices for the sold items and a length of time that was required to sell the sold items at the range of sales prices.

20. The non-transitory computer-readable medium of claim 18, the operations further comprising:
   receiving, via the user interface, an indication of a minimum buyer rating from the seller;
   identifying a subset of a plurality of different buyers that satisfy the minimum buyer rating, wherein one or more of the plurality of different buyers do not satisfy the minimum buyer rating; and
   monitoring only the subset of the plurality of different buyers that satisfy the minimum buyer rating.

\* \* \* \* \*

UNITED STATES PATENT AND TRADEMARK OFFICE
CERTIFICATE OF CORRECTION

PATENT NO. : 12,469,059 B2  
APPLICATION NO. : 17/891520  
DATED : November 11, 2025  
INVENTOR(S) : Smith et al.

Page 1 of 1

It is certified that error appears in the above-identified patent and that said Letters Patent is hereby corrected as shown below:

In the Claims

In Column 15, Claim 5, Line 31, delete "simultaneous simultaneously" and insert -- simultaneous --, therefor.

Signed and Sealed this  
Thirteenth Day of January, 2026

John A. Squires  
*Director of the United States Patent and Trademark Office*